(12) United States Patent
Nishizawa

(10) Patent No.: US 6,782,482 B2
(45) Date of Patent: Aug. 24, 2004

(54) IMAGE PROCESSING APPARATUS HAS A CPU THAT REDUCES OPERATION CAPABILITY OF LARGE SCALE INTEGRATION CIRCUIT BY SWITCHING LARGE SCALE INTEGRATION CIRCUIT TO LOW POWER SAVE MODE

(75) Inventor: Akinori Nishizawa, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 617 days.

(21) Appl. No.: 09/818,136

(22) Filed: Mar. 26, 2001

(65) Prior Publication Data

US 2001/0039627 A1 Nov. 8, 2001

(30) Foreign Application Priority Data

Apr. 17, 2000 (JP) ........................................ 2000-114914

(51) Int. Cl.⁷ .............................. G06F 4/26; G06F 1/32; G09G 5/00
(52) U.S. Cl. ........................ 713/320; 713/300; 345/211; 345/212
(58) Field of Search ................................ 713/300, 601, 713/323, 501, 324; 714/24; 345/211, 212; 340/573, 539; 356/607; 327/544

(56) References Cited

U.S. PATENT DOCUMENTS

| | | | | |
|---|---|---|---|---|
| 5,491,788 A | * | 2/1996 | Cepulis et al. ................ | 714/13 |
| 5,563,579 A | * | 10/1996 | Carter .................... | 340/539.17 |
| 5,982,520 A | * | 11/1999 | Weiser et al. ................ | 398/126 |
| 6,016,548 A | * | 1/2000 | Nakamura et al. .......... | 713/323 |
| 6,076,171 A | * | 6/2000 | Kawata ....................... | 713/501 |
| 6,311,287 B1 | * | 10/2001 | Dischler et al. ............ | 713/601 |
| 6,480,287 B2 | * | 11/2002 | Lee et al. .................... | 356/607 |
| 6,601,179 B1 | * | 7/2003 | Jackson et al. ............. | 713/322 |

FOREIGN PATENT DOCUMENTS

| | | |
|---|---|---|
| JP | 09-288527 | 11/1997 |
| JP | 11-088467 | 3/1999 |

* cited by examiner

Primary Examiner—Thomas Lee
Assistant Examiner—Chun Cao
(74) Attorney, Agent, or Firm—Hogan & Hartson, LLP

(57) ABSTRACT

An image processing machine (F) such as facsimile machine includes at least one large scale integrated (LSI) circuit (12, 13, 14, 20, 21, 22, 30, 31) for executing image processing. A power supply unit (5) feeds electricity to the respective large scale integrated circuits. The image processing machine includes a controller (1) for lowering operation capability of some large scale integrated circuits when shifting into a power save mode. The image processing machine may further include oscillators for feeding clock signals to the respective large scale integrated circuits, and the control unit may cause the oscillators to issue the clock signals with a lower frequency when switching to the power save mode.

18 Claims, 1 Drawing Sheet

IMAGE PROCESSING APPARATUS HAS A CPU THAT REDUCES OPERATION CAPABILITY OF LARGE SCALE INTEGRATION CIRCUIT BY SWITCHING LARGE SCALE INTEGRATION CIRCUIT TO LOW POWER SAVE MODE

CROSS REFERENCES TO RELATED APPLICATION

This application claims priority under 35 USC 119 of Japanese Patent Application No. 2000-114914 filed on Apr. 17, 2000, the entire disclosure of which is incorporated herein by reference.

BACKGROUND OF THE INVENTION

1. Field of the Invention

The present invention relates to image processing apparatus such as facsimile machines that have a power save mode for suppressing power consumption. The present invention also relates to a method of controlling such image processing apparatus.

2. Description of the Related Art

Recently many image processing machines such as facsimile machines which are widely used in offices have a power save mode to reduce power consumption when the machines are not used for a particular period of time.

Typically a conventional image processing machine divides its parts into a plurality of groups with respect to their functions, and interrupts power supply to those groups which are not in service. This is the conventional way of power saving.

SUMMARY OF THE INVENTION

A general object of the present invention is to provide an image processing apparatus that can enable power saving by another approach.

Another object of the present invention is to provide a method of controlling such image processing apparatus.

According to one aspect of the present invention, there is provided an image processing apparatus operable in a normal power supply mode and a power save mode, including at least one large scale integrated (LSI) circuit for executing image processing, a power supply unit for feeding electricity to the respective LSI circuit, and a control unit for lowering operation capability of at least one of the LSI circuits when canceling a normal power supply mode and shifting into a power save mode.

The image processing apparatus may further include an oscillator for feeding a clock signal to the respective LSI circuit, and the control unit may cause the oscillator to issue the clock signal with a lower frequency when canceling the normal power supply mode and shifting into the power save mode. By lowering the clock signal frequency, the operation capability of the LSI is degraded.

The control unit may reset the respective LSI when shifting to the power save mode. By resetting the LSI, the operation capability of the LSI is degraded.

The control unit may maintain the respective LSI circuit in a reset condition when shifting to the power save mode.

The control unit may cause the power supply unit to feed a lower voltage, including zero voltage, to the respective LSI circuit when shifting to the power save mode. By lowering the feed voltage, the operation capability of the LSI is degraded.

According to another aspect of the present invention, there is provided a method of controlling an image processing apparatus having at least one LSI circuit for image processing, including the step A of determining whether a predetermined period elapses without any operations performed in a normal power supply mode, and the step B of lowering operation capability of at least one of the LSI circuits when the step A determines that the predetermined period has elapsed without any operations performed in the normal power supply mode.

The step B may include the sub-step of lowering a frequency of a clock signal to be fed to the respective LSI circuit. The step B may include another sub-step of resetting the respective LSI circuit. The respective LSI circuit may be maintained in a reset condition. Alternatively, voltage to be fed to the respective LSI circuit may be reduced in the step B.

Additional objects, aspects and advantages of the present invention will become apparent to those skilled in the art to which the invention relates from the subsequent detailed description of the invention and appended claims taken in conjunction with the accompanying drawings.

DETAILED DESCRIPTION OF THE INVENTION

Figure 1:
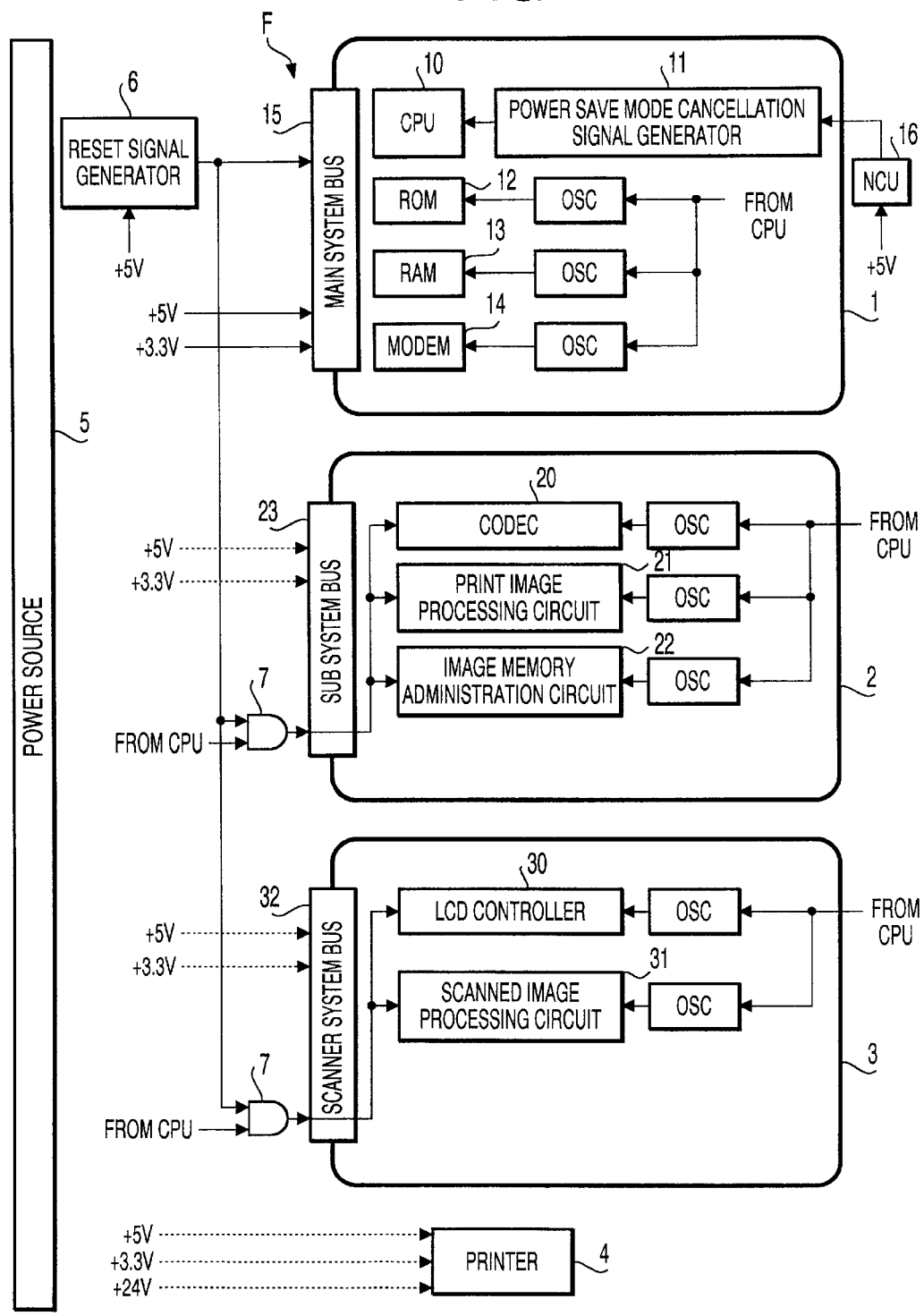
FIG. 1 illustrates a block diagram of major parts in an image processing apparatus according to the present invention.

Now, an embodiment of the present invention will be described in reference to the accompanying drawing.

Referring to FIG. 1, illustrated is a block diagram of a facsimile machine F, which is an example of image processing machines according to the present invention. It should be noted that the present invention is not limited to the illustrated facsimile machine F. For example, the present invention is applicable to a personal computer with LSI that has a power save mode and an image processing function.

The facsimile machine F is grouped into a main system 1, subsystem 2, scanner system 3 and printer 4 with respect to their functions. The main system 1 includes CPU 10, which is a control unit of the invention, to control every hardware element of the facsimile machine F. The main system 1 also includes a power save mode cancellation unit 11 for generating a signal to cancel a power save mode, ROM 12 for storing various programs needed for the facsimile machine F to appropriately operate, RAM 13 for storing one-touch speed dial numbers or the like, and a modem 14 for modulating and demodulating various signals for facsimile communication. These hardware elements are connected to each other over a main system bus 15.

The subsystem 2 includes a codec 20 for coding and decoding image data, a print image processing circuit 21 for smoothing the image data, converting image data resolution, generating control timing for the printer 4 and executing other tasks, and an image memory administration circuit 22 for administering an image memory (not shown) to change the order of reading out of the image data from the image memory thereby rotating the image. These elements of the subsystem 2 are connected to each other over a subsystem bus 23.

The scanner system 3 includes an LCD controller 30 for causing LCD (not shown) to display information and data, and a scanned image processing circuit 31 for performing image processing during the scanning, including shading correction, gamma correction, bi-level coding, magnification and reduction. These elements are connected to each other by a scanner system bus 32.

ROM 12, RAM 13, modem 14, codec 20, print image processing circuit 21, image memory administration circuit 22, LCD controller 30 and scanned image processing circuit 31 are constituted by LSIs respectively, and are operated upon clock signals from associated crystal oscillator circuits OSC under the control of CPU 10.

Power is fed to the above mentioned elements of the facsimile machine F from a power source 5. During a normal power supply mode, the power source 5 feeds electricity of 5V and 3.3V to the main system 1 as indicated by the solid line, and 5V and 3.3V to the subsystem 2 and scanner system 3 as indicated by the broken line. The power source 5 also feeds 5V to a reset signal generator 6 for generating a reset signal to request initialization, and NCU 16 for controlling connection to a telephone line (not shown) as indicated by the solid line, and feeds 5V, 3.3V and 24V to the printer 4 as indicated by the broken line.

This facsimile machine F is switched to a power save mode if a predetermined period elapses without any operations performed in the normal power supply mode, or a power save key (not shown) is pressed. In the power save mode, CPU 10 lowers operation capability of LSIs 12, 13, 14, 20, 21, 22, 30 and 31.

One approach proposed by the present invention to degrade the operation capabilities of LSIs is reduction of frequencies of the clock signals input to the respective LSIs. CPU 10 causes the crystal oscillator circuits OSC to generate lower frequency clock signals. It should be noted that feeding of the clock signals may be completely stopped. In this instance, however, some type(s) of LSI may malfunction. Therefore, CPU 10 needs to output reset signals by itself or causes the reset signal generator 6 to provide the rest signals in order to initialize the respective LSIs. In the illustrated embodiment, LSIs 20, 21, 22, 30 and 31 are initialized. An AND circuit 7 is low active. When a reset signal is input to each AND circuit 7 from CPU 10 or reset signal generator 6 such that the AND circuit 7 outputs the reset signal from its low output, that reset signal is fed to the subsystem 2 (or the scanner system 3). Upon receiving the reset signals, the respective LSIs 20, 21, 22, 30 and 31 are initialized.

A second approach proposed by the present invention is to initialize the respective LSIs. CPU 10 or reset signal generator 6 outputs reset signals to LSIs 20, 21, 22, 30 and 31 for initialization. LSIs are then maintained in that condition.

A third approach is to drop the voltages to be supplied to LSIs. The power source 5 reduces the voltage to the subsystem 2 and scanner system 3 and stops feeding the voltage to the printer 4. It should be noted that the voltage application to the subsystem 2 and/or scanner system 3 may also be shut down.

The reason why the voltage application from the power source 5 to the main system 1, reset signal generator 6 and NCU 16 is not reduced is because the facsimile machine F should be ready to receive a ringing signal transmitted over the telephone line and/or facsimile network, monitor the time to execute predetermined jobs and tasks, and respond to mode switching instructions made by a user who presses a power save mode cancellation key (not shown). When the ringing signal is received, the predetermined time comes, or the power save mode cancellation switch is pressed, a power save mode cancellation signal generator 11 issues a power save mode cancellation signal to CPU 10. Upon receiving this cancellation signal, CPU 10 switches the mode to the normal power supply mode so that the power source 5 feeds the voltage to LSIs in the normal setting. At the same time, CPU 10 or reset signal generator 6 outputs the reset signals to LSIs to initialize LSIs.

What is claimed is:

1. An image processing apparatus comprising:

a main system of a facsimile machine, including at least one large scale integrated circuit, a subsystem having at least one large scale integrated circuit, a scanner system having at least one large scale integrated circuit, and a printer having at least one large scale integrated circuit;

at least one large scale integrated circuit for executing image processing;

a power supply unit for feeding electricity to the respective large scale integrated circuit; and a control unit for lowering operation capability of at least one of the large scale integrated circuits when canceling a normal power supply mode and shifting into a power save mode, wherein the control unit reduces a voltage to be fed to the subsystem and scanner system and stops feeding a voltage to the printer when shifting to the power save mode but does not reduce a voltage to be fed to the main system.

2. The image processing apparatus according to claim 1 further including an oscillator for feeding a clock signal to the respective large scale integrated circuit, and wherein the control unit causes the oscillator to issue the clock signal with a lower frequency when shifting into the power save mode.

3. The image processing apparatus according to claim 2, wherein the control unit resets the respective large scale integrated circuit when shifting to the power save mode.

4. The image processing apparatus according to claim 1, wherein the control unit maintains the respective large scale integrated circuit in a reset condition after shifting to the power save mode.

5. The image processing apparatus according to claim 1, wherein the control unit causes the power supply unit to feed a lower voltage to the respective large scale integrated circuit when shifting to the power save mode.

6. The image processing apparatus according to claim 1, wherein the at least one large scale integrated circuit includes at least one of ROM, RAM, modem, codec, print image processing circuit, image memory administration circuit, liquid crystal display controller and scanned image processing circuit.

7. The image processing apparatus according to claim 1, wherein the control unit initializes the respective large scale integrated circuit.

8. The image processing apparatus according to claim 5, wherein the lower voltage includes zero voltage.

9. The image processing apparatus according to claim 1, wherein the control unit reduces at least one of the voltage to be fed to the subsystem and scanner system to zero.

10. A method of controlling an image processing apparatus having at least one large scale integrated circuit for image processing, wherein the image processing apparatus is a facsimile machine that includes a main system having at least one large scale integrated circuit, a subsystem having at least one large scale integrated circuit, a scanner system having at least one large scale integrated circuit and a printer having at least one large scale integrated circuit, comprising the steps of:

A) determining whether a predetermined period elapses without any operations performed in a normal power supply mode; and B) lowering operation capability of a respective large scale integrated circuit when it is determined at the step A that the predetermined period has elapsed without any operations performed in the normal power supply mode and reducing a voltage to be fed to the subsystem and scanner system and the sub step of stopping feeding a voltage to the printer when shifting to the power save mode but not reducing a voltage to be fed to the main system.

11. The method according to claim 10, wherein the step B includes the sub-step of B1) lowering a frequency of a clock signal to be fed to the respective large scale integrated circuit.

12. The method according to claim 11, wherein the step B includes the second sub-step of B2) resetting the respective large scale integrated circuit.

13. The method according to claim 10, wherein the respective large scale integrated circuit is maintained in a reset condition in the step B.

14. The method according to claim 10, wherein voltage to be fed to the respective large scale integrated circuit is reduced in the step B.

15. The method according to claim 10, wherein the at least one large scale integrated circuit includes at lease one of ROM, RAM, modem, codec, print image processing circuit, image memory administration circuit, liquid crystal display controller and scanned image processing circuit.

16. The method according to claim 10, wherein the step B includes the sub step of initializing the respective large scale integrated circuit.

17. The method according to claim 14, wherein the lower voltage includes zero voltage.

18. The image processing apparatus according to claim 10, wherein the step B includes the substep of reducing at least one of the voltage to be fed to the subsystem and scanner system to zero.

* * * * *